(12) United States Patent
Mosayyebpour Kaskari (10) Patent No.: US 12,505,849 B2
(45) Date of Patent: Dec. 23, 2025

(54) MULTI-PASS NEURAL NETWORK FOR SPEECH ENHANCEMENT

(71) Applicant: Synaptics Incorporated, San Jose, CA (US)

(72) Inventor: Saeed Mosayyebpour Kaskari, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 401 days.

(21) Appl. No.: 18/155,674

(22) Filed: Jan. 17, 2023

(65) Prior Publication Data

US 2024/0242726 A1    Jul. 18, 2024

(51) Int. Cl.
*G10L 25/30*    (2013.01)
*G10L 21/0208*    (2013.01)

(52) U.S. Cl.
CPC .......... *G10L 21/0208* (2013.01); *G10L 25/30* (2013.01)

(58) Field of Classification Search
CPC ............................ G10L 25/30; G10L 21/0208
USPC ........................................................ 704/226
See application file for complete search history.

(56) References Cited

U.S. PATENT DOCUMENTS 5,638,487 A * 6/1997 Chigier .................... G10L 15/04
  704/E15.005
7,343,283 B2 * 3/2008 Ashley ..................... G10L 19/06
  704/226
2018/0182411 A1    6/2018 Kaskari et al.
2018/0308503 A1    10/2018 Kaskari et al.
2019/0130161 A1 *  5/2019 Chang ....................... G06T 7/60

(Continued)

FOREIGN PATENT DOCUMENTS

CN       111883171 A  * 11/2020 ............. G10L 25/18
DE    102019112383 A1 * 12/2019 ............... G06N 3/08
KR     20240030483 A  *  3/2024 ......... G10L 21/0208

OTHER PUBLICATIONS

Q. tao, D. hao, Y. yong, Z. yifei, Y. changmao and L. yuxuan, "Speech recognition based on denoising self coding neural network," 2020 International Conference on Big Data, Artificial Intelligence and Internet of Things Engineering (ICBAIE), Fuzhou, China, 2020 , pp. 327-333, doi: 10.1109/ICBAIE49996. (Year: 2020).*

(Continued)

*Primary Examiner* — Bharatkumar S Shah
(74) *Attorney, Agent, or Firm* — Paradice & Li LLP (57) ABSTRACT

This disclosure provides methods, devices, and systems for audio signal processing. The present implementations more specifically relate to multi-pass neural networks configured for speech enhancement. In some aspects, a speech enhancement system may include a deep neural network (DNN) and a statistical signal processor (SSP). The DNN is configured to receive an input audio signal and infer a speech signal representing a speech component of the input audio signal based on a neural network model. The SSP is configured to further denoise the speech signal output by the DNN based on one or more statistical signal processing operations. In some implementations, the denoised speech signal may be fed back into the DNN (as an input audio signal) for further speech enhancement. As such, the speech enhancement system may recursively filter or suppress residual noise in the speech signal over a number of passes or iterations of a feedback loop.

20 Claims, 8 Drawing Sheets

(56) References Cited

U.S. PATENT DOCUMENTS

| | | | |
|---|---|---|---|
| 2019/0172476 A1 | 6/2019 | Wung et al. | |
| 2019/0385630 A1 | 12/2019 | Sivaraman et al. | |
| 2021/0125622 A1* | 4/2021 | Zhao | G10L 25/21 |
| 2022/0013123 A1 | 1/2022 | Xu et al. | |
| 2022/0122597 A1 | 4/2022 | Ji et al. | |
| 2023/0074658 A1 | 3/2023 | Sereshki et al. | |
| 2023/0090763 A1* | 3/2023 | Ozturk | G10L 25/30 455/456.1 |

OTHER PUBLICATIONS

Athineos et al., "Frequency-Domain Linear Prediction for Temporal Features," in Proc. IEEE ASRU Workshop, pp. 261-266, Dec. 2003.

Nesta et al., "On-line Multi-Channel Estimation of Source Spectral Dominance," in International Conference on Latent Variable Analysis and Signal Separation. Springer, pp. 404-412, 2015.

Tashev et al., "Unified Framework for Single Channel Speech Enhancement," IEEE Pacific Rim Conference on Communications, Computers and Signal Processing, 6 pages, Aug. 2009.

Wang et al., "Sequential Multi-frame Neural Beamforming for Speech Separation and Enhancement," 2021 IEEE Spoken Language Technology Workshop (SLT), 2021, pp. 905-911, 2021.

Zhang et al., "Multi-Channel Multi-Frame ADL-MVDR for Target Speech Separation," 12 pages, arXiv:2012.13442v1 [eess.AS] Dec. 24, 2020.

International Search Report and Written Opinion from PCT Application No. PCT/US2024/027104, dated Aug. 20, 2024, pp. 1-10.

Graf et al., "Features for Voice Activity Detection: A Comparative Analysis," EURASIP Journal on Advances in Signal Processing, pp. 1-15, (2015) 2015:91.

Shen et al. "Voice Activity Detection Based on Sequential Gaussian Mixture Model with Maximum Likelihood Criterion", IEEE, International Symposium on Chinese Spoken Language Processing (ISCSLP), pp. 1-5, Oct. 2016.

U.S. Appl. No. 18/160,278, filed Jan. 26, 2023, entitled "Neural Temporal Beamformer for Noise Reduction in Single-Channel Audio Signals," 38 pgs.

U.S. Appl. No. 18/310,818, filed May 2, 2023, entitled "Neural Noise Reduction With Linear and Nonlinear Filtering for Single-Channel Audio Signals," 35 pgs.

Zhou et al. ("A robust dual-microphone generalized sidelobe canceller using a bone-conduction sensor for speech enhancement." Sensors 21.5 (2021)) (Year: 2021).

Tammen et al., ("DNN-Based Speech Presence Probability Estimation for Multi-Frame Single-Microphone Speech Enhancement," ICASSP 2020—2020 IEEE International Conference on Acoustics, Speech and Signal Processing (ICASSP), Barcelona, Spain, 2020) (Year: 2020).

Tammen et al., ("Deep multi-frame MVDR filtering for single-microphone speech enhancement." ICASSP 2021-2021 IEEE International Conference on Acoustics, Speech and Signal Processing (ICASSP). IEEE, 2021) (Year: 2021).

* cited by examiner

MULTI-PASS NEURAL NETWORK FOR SPEECH ENHANCEMENT

TECHNICAL FIELD

The present implementations relate generally to signal processing, and specifically to a multi-pass neural network for speech enhancement in audio signals.

BACKGROUND OF RELATED ART

Many hands-free communication devices include a microphone configured to convert sound waves into a single channel of audio signals that can be transmitted, over a communications channel, to a receiving device. The audio signals may include speech (such as from a user of the communication device) and background noise (such as from a reverberant enclosure). Speech enhancement is a signal processing technique that attempts to suppress the noise in the received audio signals without distorting the speech. Many existing speech enhancement techniques rely on statistical signal processing algorithms that continuously track the pattern of noise in each frame of the audio signal to model a spectral suppression gain or filter that can be applied to the received audio signal in a time-frequency domain.

Some modern speech enhancement techniques implement machine learning to model a spectral suppression gain or filter that can be applied to the received audio signal in the time-frequency domain. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system). For example, each layer of an artificial neural network may be composed of one or more "neurons." The neurons may be interconnected across the various layers so that the input data can be processed and passed from one layer to another. More specifically, each layer of neurons may perform a different transformation on the output data from a preceding layer so that the final output of the neural network results in a desired inference. The set of transformations associated with the various layers of the network is referred to as a "neural network model."

The size of a neural network (such as the number of layers in the neural network or the number of neurons in each layer) generally affects the accuracy of the inferencing result. More specifically, larger neural networks tend to produce more accurate inferences than smaller or more compact neural networks. As such, existing neural network architectures require significant processing power and memory to achieve accurate speech enhancement, particularly for single-channel audio signals. However, single channel speech enhancement is often used in low power edge devices with limited resources (such as battery-powered headsets or earbuds). Thus, there is a need to reduce the power consumption and memory requirements of machine learning architectures used for speech enhancement.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes steps of receiving a first frame of an audio signal; inferring a first speech signal representing a speech component of the first frame based on a neural network model; denoising the first speech signal based at least in part on one or more statistical signal processing operations; and inferring a second speech signal representing a speech component of the denoised first speech signal based on the neural network model.

Another innovative aspect of the subject matter of this disclosure can be implemented in a speech enhancement system, including a processing system and a memory. The memory stores instructions that, when executed by the processing system, cause the speech enhancement system to receive a first frame of an audio signal; infer a first speech signal representing a speech component of the first frame based on a neural network model; denoise the first speech signal based at least in part on one or more statistical signal processing operations; and infer a second speech signal representing a speech component of the denoised first speech signal based on the neural network model.

BRIEF DESCRIPTION OF THE DRAWINGS

The present implementations are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, some modern speech enhancement techniques may implement machine learning to model a spectral suppression gain or filter that can be applied to a received audio signal in the time-frequency domain. Machine learning, which generally includes a training phase and an inferencing phase, is a technique for improving the ability of a computer system or application to perform a certain task. Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system).

The size of a neural network (such as the number of layers in the neural network or the number of neurons in each layer) generally affects the accuracy of the inferencing result. More specifically, larger neural networks tend to produce more accurate inferences than smaller or more compact neural networks. As such, existing neural network architectures require significant processing power and memory to achieve accurate speech enhancement, particularly for single-channel audio signals. However, single channel speech enhancement is often used in low power edge devices with limited resources (such as battery-powered headsets or earbuds). Thus, compact neural networks may be more suitable than larger neural networks for many single channel speech enhancement applications.

Compact neural networks used for speech enhancement may produce output signals having some speech distortion or noise leakage (also referred to as "residual noise"). However, aspects of the present disclosure recognize that the residual noise can be recursively filtered by passing the output signals back into the neural network. In other words, the same neural network can be reused, in a feedback loop, to iteratively improve the quality of speech in the output signal over multiple "passes" through the feedback loop.

Various aspects relate generally to audio signal processing, and more particularly, to multi-pass neural networks configured for speech enhancement. In some aspects, a speech enhancement system may include a deep neural network (DNN) and a statistical signal processor (SSP). The DNN is configured to receive an input audio signal and infer a speech signal representing a speech component of the input audio signal based on a neural network model. The SSP is configured to further denoise the speech signal output by the DNN based on one or more statistical signal processing operations. Example suitable statistical signal processing operations may include, among other examples, linear filtering operations and nonlinear filtering operations. In some implementations, the denoised speech signal may be fed back into the DNN (as an input audio signal) for further speech enhancement. As such, the speech enhancement system may recursively filter or suppress residual noise in the speech signal by providing the output of the SSP as the input to the DNN, in a feedback loop, over a number of passes or iterations.

Particular implementations of the subject matter described in this disclosure can be implemented to realize one or more of the following potential advantages. By recursively filtering residual noise in speech signals inferred by a DNN, aspects of the present disclosure can iteratively improve the speech quality of any single-channel audio signal. More specifically, the amount of noise suppressed by the speech enhancement system may depend on the number of iterations of the feedback loop (in which the output of the SSP is fed back into the DNN). Accordingly, the speech enhancement system of the present implementations may use a relatively compact neural network to achieve inferencing results similar to much larger neural networks. Because the same DNN is used to process each audio signal (or frame of an audio signal) over multiple iterations, no additional memory is needed for each additional iteration of the feedback loop. As such, the speech enhancement system of the present implementations may be well-suited for implementation in edge devices with limited resources.

Figure 1:
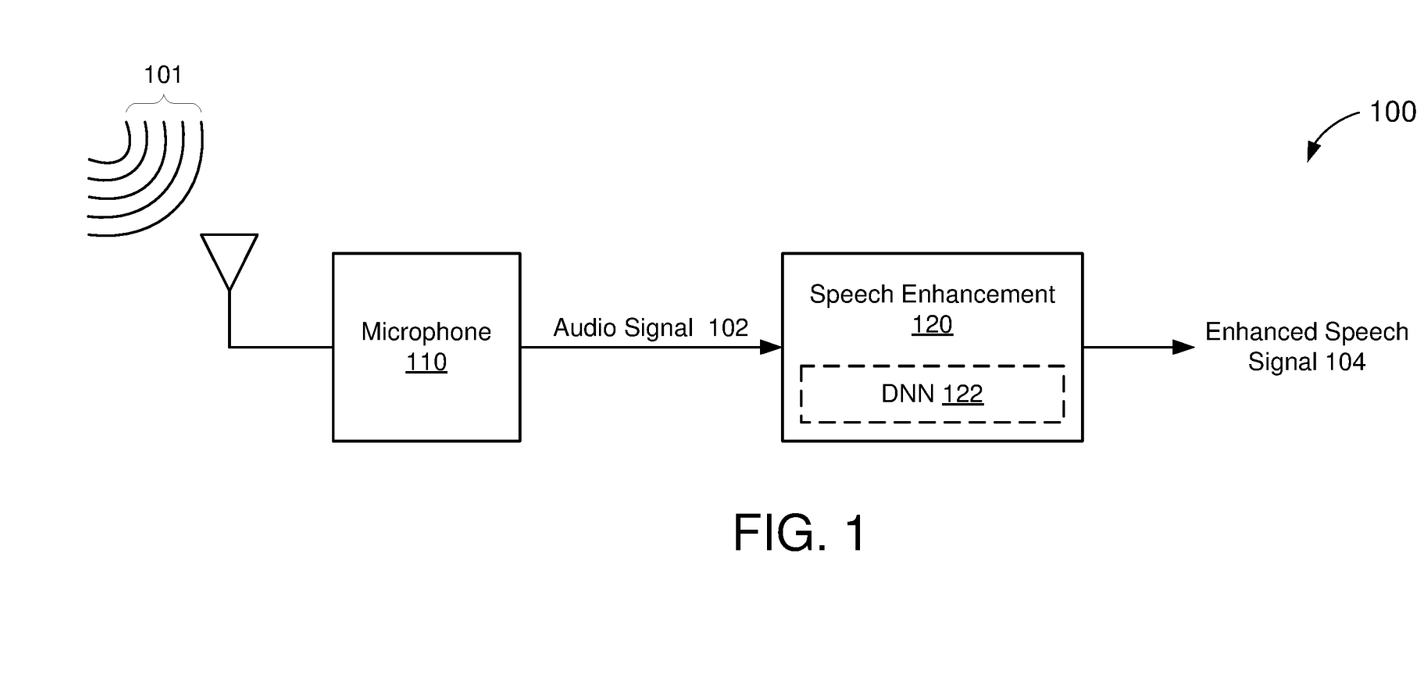
FIG. 1 shows an example audio receiver that supports single channel speech enhancement.

FIG. 1 shows an example audio receiver 100 that supports single channel speech enhancement. The audio receiver 100 includes a microphone 110 and a speech enhancement component 120. The microphone 110 is configured to convert sound waves 101 (also referred to as "acoustic waves") into an audio signal 102. Thus, the audio signal 102 is an electrical signal representative of the acoustic waveform. In some aspects, the microphone may be associated with a single audio channel. Thus, the audio signal 102 also may be referred to as a "single-channel" audio signal.

In some implementations, the sound waves 101 may include user speech mixed with background noise or interference (such as reverberant noise from a headset enclosure). Thus, the audio signal 102 may include a speech component and a noise component. The speech enhancement component 120 is configured to improve the quality of speech in the audio signal 102, for example, by suppressing the noise component or otherwise increasing the signal-to-noise ratio (SNR) of the audio signal 102. In some implementations, the speech enhancement component 120 may apply a spectral suppression gain or filter to the audio signal 102. The spectral suppression gain attenuates the power of the noise component of the audio signal 102, in a time-frequency domain, to produce an enhanced speech signal 104. Thus, the enhanced speech signal 104 may have a higher SNR than the audio signal 102.

In some implementations, the speech enhancement component 120 may determine a spectral suppression gain to be applied to the audio signal 102 based, at least in part, on a deep neural network (DNN) 122. For example, the DNN 122 may be trained to infer a likelihood or probability of speech in the time-frequency domain. Example suitable DNNs may include, among other examples, convolutional neural networks (CNNs) and recurrent neural networks (RNNs). During the training phase, the DNN 122 may be provided with a large volume of audio signals containing speech mixed with background noise. The DNN 122 also may be provided with clean speech signals representing only the speech component of each audio signal (without background noise). The DNN 122 may compare the audio signals with the clean speech signals to determine a set of features that can be used to classify speech.

During the inferencing phase, the DNN 122 may determine a probability of speech in each frame of the audio signal 102, at each frequency index associated with the time-frequency domain, based on the classification results. The DNN 122 may further convert the probability of speech determined for each frequency index into a spectral suppression gain that can be used to suppress the noise component of the corresponding frame of the audio signal 102. For example, if there is a low probability of speech in a given frame of the audio signal 102 at a particular frequency index, the DNN 122 may apply a lower gain to reduce the power at that frequency index of the corresponding audio frame. As a result, the DNN 122 may dynamically attenuate the noise component of the audio signal 102 in the time-frequency domain.

As described above, the size of a neural network (such as the number of layers in the neural network or the number of neurons in each layer) generally affects the accuracy of the inferencing result. More specifically, larger neural networks tend to produce more accurate inferences than smaller or more compact neural networks. As such, existing neural network architectures require significant processing power and memory to achieve accurate speech enhancement, particularly for single-channel audio signals. However, single channel speech enhancement is often used in low power edge devices with limited resources (such as battery-powered headsets or earbuds). Thus, compact neural networks may be more suitable than larger neural networks for many single channel speech enhancement applications.

In some implementations, the DNN 122 may be a relatively compact neural network. As a result, the DNN 122 may not filter at least some of the noise in the audio signal 102. In other words, the DNN 122 may produce output signals having some speech distortion or noise leakage (also referred to as "residual noise"). Aspects of the present disclosure recognize that the residual noise can be recursively filtered by passing the output signals back into the DNN 122. In other words, the DNN 122 can be reused, in a feedback loop, to iteratively improve the quality of speech in the output signal over multiple "passes" through the feedback loop. After a threshold number of passes are completed, the speech enhancement component 120 may provide the final output of the DNN 122 as the enhanced speech signal 104.

Figure 2:
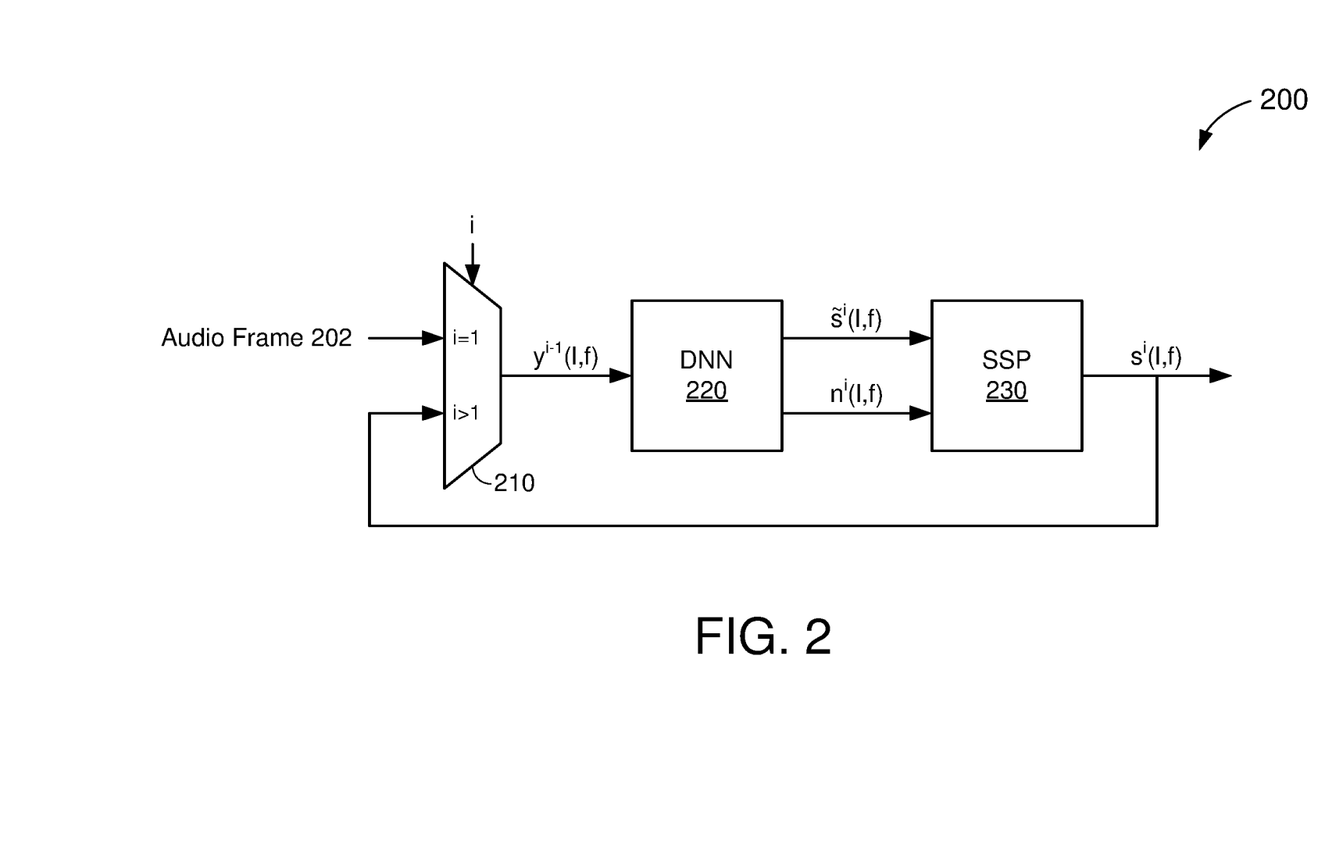
FIG. 2 shows a block diagram of an example speech enhancement system, according to some implementations.

FIG. 2 shows a block diagram of an example speech enhancement system 200, according to some implementations. In some implementations, the speech enhancement system 200 may be one example of the speech enhancement component 120 of FIG. 1. More specifically, the speech enhancement system 200 is configured to receive a frame 202 of an audio signal and produce a corresponding frame of an enhanced audio signal by recursively suppressing noise in the received audio frame 202 over a number (N) of iterations (i) of a multi-pass speech enhancement operation, where $1 \leq i \leq N$. With reference for example to FIG. 1, the input audio signal may be one example of the single-channel audio signal 102 and the enhanced audio signal may be one example of the enhanced speech signal 104.

In some implementations, the speech enhancement system 200 may include an input selector 210, a DNN 220, and a statistical signal processor (SSP) 230. The input selector 210 is configured to receive the audio frame 202 and an output of the SSP 230 and selectively provide one of the received signals, as an input audio signal ($y^{i-1}(l,f)$), to the DNN 220 based on the current iteration i of the speech enhancement operation (where l is a frame index and k is a frequency index associated with a time-frequency domain). More specifically, the input selector 210 is configured to select the audio frame 202, as the input audio signal $y^{i-1}(l,f)$, during the first iteration (i=1) of the speech enhancement operation and to select the output of the SSP 230, as the input audio signal $y^{i-1}(l,f)$, during each subsequent iteration ($1<i\leq N$) of the speech enhancement operation. In the example of FIG. 2, the input selector 210 is depicted as a multiplexer (MUX). However, in actual implementations, any suitable switching circuitry may be used as the input selector 210.

The DNN 220 is configured to suppress noise in the input audio signal $y^{i-1}(l,f)$ based on a neural network model. In some implementations, the DNN 220 may be one example of the DNN 122 of FIG. 1. More specifically, the DNN 220 may be configured to infer a speech signal ($\tilde{s}^i(l,f)$) representing a speech component of the input audio signal $y^{i-1}(l,f)$. For example, the DNN 220 may compute a spectral suppression gain ($G_{DNN}^i(l,f)$) by processing the input audio signal $y^{i-1}(l,f)$ through various neural network layers (such as convolutional layers, pooling layers, and fully connected layers) and may apply the spectral suppression gain $G_{DNN}^i(l,f)$ to the input audio signal $y^{i-1}(l,f)$ to produce the speech signal $\tilde{s}^i(l,f)$. In some implementations, the DNN 220 also may infer a noise signal ($n^i(l,f)$) representing a noise component of the input audio signal $y^{i-1}(l,f)$. For example, the noise signal $n^i(l,f)$ may be computed as a difference between the input audio signal $y^{i-1}(l,f)$ and the speech signal $\tilde{s}^i(l,f)$ (where $n^i(l,f) = y^{i-1}(l,f) - \tilde{s}^i(l,f)$).

In some aspects, the neural network model implemented by the DNN 220 may be biased towards minimizing speech distortion rather than maximizing noise suppression. As a result, the speech signal $\tilde{s}^i(l,f)$ may include at least some residual noise that is not filtered or suppressed by the DNN 220. In some implementations, a portion of the input signal $y^{i-1}(l,f)$ may be added to the output of the DNN 220 (DNN($y^{i-1}(l,f)$)) to ensure that the speech component of the input signal $y^{i-1}(l,f)$ is not distorted (while further adding back some residual noise. For example, the resulting speech signal $\tilde{s}_i(l,f)$ may be produced according to Equation 1, below:

$$\tilde{s}^i(l,f) = DNN(y^{i-1}(l,f)) + \alpha^i y^{i-1}(l,f) \quad (1)$$

where $\alpha^i$ is a scaling factor that can be tuned based on the aggressiveness of noise suppression by the DNN 220. For example, if the DNN 220 is very aggressive at suppressing noise, the resulting inferences may include more significant speech distortion and a larger scaling factor $\alpha^i$ may be used to mitigate the speech distortion by the DNN 220. On the other hand, if the DNN 220 is less aggressive at suppressing noise, the resulting inferences may include less speech distortion and a smaller scaling factor $\alpha^i$ may be used to mitigate the speech distortion by the DNN 220.

The SSP 230 is configured to denoise the speech signal $\tilde{s}^i(l,f)$ by filtering the residual noise based at least in part on one or more statistical signal processing operations. Unlike neural network models, the calculations associated with statistical signal processing are not modeled after training data. Rather, the SSP 230 may filter the residual noise in the speech signal $\tilde{s}^i(l,f)$ based on statistical properties of the speech signal $\tilde{s}^i(l,f)$ (or the noise signal $n^i(l,f)$). In some implementations, the SSP 230 may produce a denoised speech signal ($s^i(l,f)$) by applying a linear filter to the speech signal $\tilde{s}^i(l,f)$. An example suitable linear filter may include, among other examples, a multi-frame beamforming filter. In some other implementations, the SSP 230 may produce the denoised speech signal $s^i(l,f)$ by applying a nonlinear filter to the speech signal $\tilde{s}^i(l,f)$. An example suitable nonlinear filter may include, among other examples, a Gaussian mixture model (GMM) with spectral subtraction.

In some aspects, the denoised speech signal $s^i(l,f)$ may be fed back, as the input signal $y^{i-1}(l,f)$, to the DNN 220 (via the input selector 210) as long as the speech enhancement operation has not yet exceeded a threshold number of iterations (i<N). Thus, with each iteration of the speech enhancement operation, the DNN 220 and the SSP 230 produce a denoised speech signal $s^i(l,f)$ with slightly less noise than a previous iteration of the speech enhancement operation. As a result, the speech enhancement system 200 may recursively filter the noise component of the audio frame 202 over N iterations of the speech enhancement operation. After the $N^{th}$ iteration of the speech enhancement operation, the speech enhancement system 200 may output the final denoised speech signal $s^N(l,f)$ as an enhanced audio frame (such as a frame of the enhanced speech signal 104 of FIG. 1).

Figure 3:
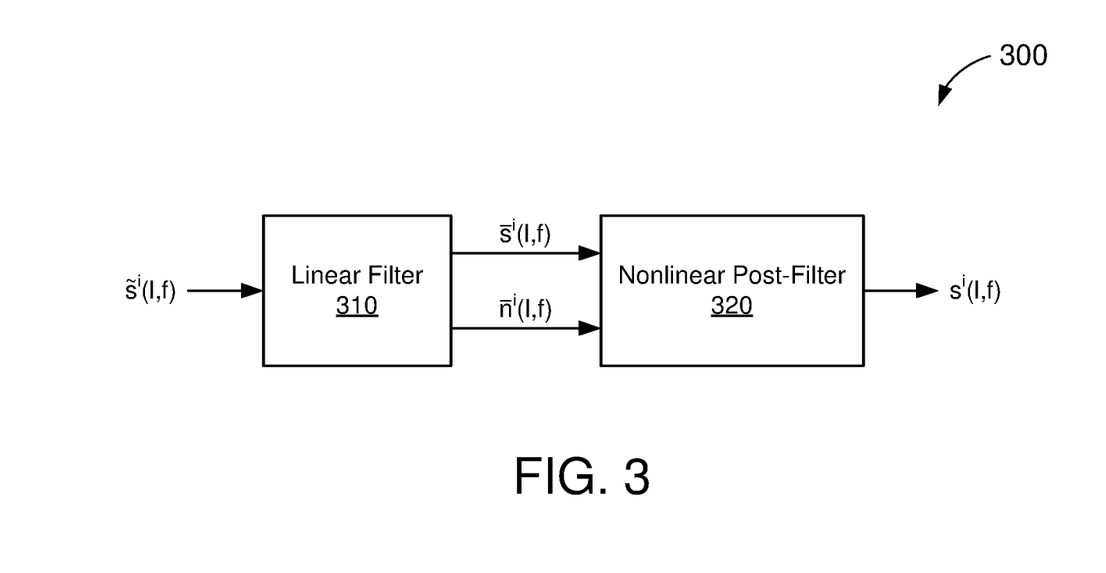
FIG. 3 shows a block diagram of an example statistical signal processing (SSP) system, according to some implementations.

FIG. 3 shows a block diagram of an example statistical signal processing (SSP) system 300, according to some implementations. In some implementations, the SSP system 300 may be one example of the SSP 230 of FIG. 2. More specifically, the SSP system 300 is configured to receive a speech signal $\tilde{s}^i(l,f)$ and produce a corresponding denoised speech signal $s^i(l,f)$ by suppressing noise in the speech signal $\tilde{s}^i(l,f)$ based on one or more statistical signal processing operations. In some implementations, the speech signal $\tilde{s}^i(l,f)$ may be an output of a DNN trained for speech enhancement (such as the DNN 220 of FIG. 2) and the denoised speech signal $s^i(l,f)$ may be provided as an input to the DNN (such as via a feedback loop).

In some implementations, the SSP system 300 may include a linear filter 310 and a nonlinear post-filter 320. The linear filter 310 is configured to produce a filtered speech signal $\bar{s}^i(l,f)$ and a corresponding noise signal $\bar{n}^i(l,f)$ based on the speech signal $\tilde{s}^i(l,f)$. More specifically, the linear filter 310 may perform a linear filtering operation on the speech signal $\tilde{s}^i(l,f)$ to produce the filtered speech signal $\bar{s}^i(l,f)$. In some implementations, the linear filter 310 may use a single-channel beamforming filter ($w_{SC}(l,f)$) to minimize the power of a noise component of the speech signal $\tilde{s}^i(l,f)$, without distorting a speech component of the speech signal $\tilde{s}^i(l,f)$, based on a number (L) of audio frames in the time domain. For example, an output of the linear filter 310 (Y(l,f)) can be expressed as a function of a vector of weights (w(l,f)) and an L-dimension noisy speech vector (x(l,f)), where:

$$Y(l,f) = w^H(l,f) \times (l,f)$$

-continued $$x(l, f) = [\tilde{s}^i(l, f), \tilde{s}^i(l-1, f), \ldots, \tilde{s}^i(l-L+1, f)]^T$$

$$w(l, f) = [W_0(l, f), W_1(l, f), \ldots, W_{L-1}(l, f)]^T$$

In some aspects, the linear filter 310 may produce the filtered speech signal $\bar{s}^i(l, f)$ (as the output signal Y(l, f)) based on a vector of weights w(l, f) that reduces or minimizes a variance of the noise component of the output signal Y(l, f) without distorting the speech component of the output signal Y(l, f). In other words, the linear filter 310 may determine a vector of weights w(l, f) that satisfies the following condition:

$$\text{argmin}_w w^H(l, f)\phi_{NN}(l, f)w(l, f) \text{ s.t. } w^H(l, f)\gamma(l, f) = 1$$

where $\phi_{NN}(l, f)$ is the covariance of noise at each time-frequency index and $\gamma(l, f)$ is an interframe correlation (ICF) vector of the clean speech signal. The resulting vector of weights w(l, f) represents the single-channel beamforming filter $w_{SC}(l, f)$, which can be expressed as:

$$w_{SC}(l, f) = \frac{\phi_{NN}^{-1}(l, f)\gamma(l, f)}{\gamma^H(l, f)\phi_{NN}^{-1}(l, f)\gamma(l, f)}$$

In some implementations, the linear filter 310 may estimate the noise covariance $\phi_{NN}(l, f)$ and the ICF vector $\gamma(l, f)$ based on audio frames that do not contain speech (for example, using known speech and noise covariance estimation techniques). In such implementations, the linear filter 310 may use a voice activity detector (VAD) to detect whether each frame l of the speech signal $\tilde{s}^i(l, f)$ contains speech. For example, the VAD may be a binary mask that indicates a presence (or absence) of speech in the received speech signal $\tilde{s}^i(l, f)$. In some implementations, the binary mask may be associated with the probability of speech computed by the DNN ($p_{DNN}(l, f)$) when producing the speech signal $\tilde{s}^i(l, f)$ (such as described with reference to FIG. 1). The linear filter 310 may further produce the filtered speech signal $\bar{s}^i(l, f)$ and the corresponding noise signal $\bar{n}^i(l, f)$ based on the single-channel beamforming filter $w_{SC}(l, f)(l, f)$:

$$\bar{s}^i(l, f) = w_{SC}^H(l, f) \times (l, f)$$

$$\bar{n}^i(l, f) = \tilde{s}^i(l, f) - \tilde{s}^i(l, f) - \bar{s}^i(l, f)$$

The nonlinear post-filter 320 is configured to produce the denoised speech signal $s^i(l, f)$ based on the filtered speech signal $\bar{s}^i(l, f)$ and the noise signal $\bar{n}^i(l, f)$ output by the linear filter 310. More specifically, the nonlinear post-filter 320 may perform a nonlinear filtering operation on the filtered speech signal $\bar{s}^i(l, f)$ to produce the denoised speech signal $s^i(l, f)$. Aspects of the present disclosure recognize that the filtered speech signal $\bar{s}^i(l, f)$ contains mostly target speech and the noise signal $\bar{n}^i(l, f)$ contains mostly background noise. As such, the normalized difference (e(l, f)) between the signals $\bar{s}^i(l, f)$ and $\bar{n}^i(l, f)$ may be closer to +1 when the filtered speech signal $\bar{s}^i(l, f)$ contains target speech and closer to −1 when the filtered speech signal $\bar{s}^i(l, f)$ contains only background noise, where:

$$e(l, f) = \frac{\bar{s}^i(l, f) - \bar{n}^i(l, f)}{\bar{s}^i(l, f) + \bar{n}^i(l, f)}$$

In some implementations, the nonlinear post-filter 320 may use an online GMM to determine a probability of speech ($p_{GMM}(l, f)$) in the filtered speech signal $\bar{s}^i(l, f)$ based on the normalized difference e(l, f) between the signals $\bar{s}^i(l, f)$ and $\bar{n}^i(l, f)$. For example, the normalized difference e(l, f) can be used to create a bimodal model with two Gaussian probability density functions (PDFs), including a Gaussian PDF for which target speech is dominant and a Gaussian PDF for which noise is dominant. The online GMM can be used to calculate a weight ($w_c$), mean ($\mu_c$), and variance ($\sigma_c$) for each Gaussian PDF, where c=1 represents the Gaussian PDF for which target speech is dominant and c=2 represents the Gaussian PDF for which noise is dominant:

$$w_c(l, f) = (1 - \eta_c)w_c(l-1, f) + \eta_c p_c[c]e(l, f), \lambda(l-1, f)]$$

$$\mu_c(l, f) = \frac{(1 - \eta_c)\mu_c(l-1, f) + \eta_c p_c[c]e(l, f), \lambda(l-1, f)]e(l, f)}{w_c(l, f)}$$

$$\sigma_c(l, f) = \frac{(1 - \eta_c)\sigma_c(l-1, f) + \eta_c p_c[c]e(l, f), \lambda(l-1, f)](e(l, f) - \mu_c(l, f))^2}{w_c(l, f)}$$

$$p_c[c | e(l, f), \lambda(l, f)] = \frac{w_c(l, f)p[e(l, f) | c, \lambda(l, f)]}{\sum_{c=1}^{2} w_c(l, f)p[e(l, f) | c, \lambda(l, f)]}$$

$$p[e(l, f) | c, \lambda(l, f)] = \frac{1}{\sigma_c(l, f)\sqrt{2\pi}} e^{-\frac{1}{2}\left(\frac{e(l,f)-\mu_c(l,f)}{\sigma_c(l,f)}\right)^2}$$

$$p_{GMM}(l, f) = p_{c=1}[c = 1 | e(l, f), \lambda(l, f)]$$

where $p_{GMM}(l, f)$ is a soft probability of speech at each time-frequency index, $\lambda(l, f) = \{w_1(l, f), \mu_1(l, f), \sigma_1(l, f), w_2(l, f), \mu_2(l, f), \sigma_2(l, f)\}$, and $\eta_c$ is a learning rate step size.

In some implementations, an adaptive step size ($\eta$) can be determined based on an output of the DNN:

$$VAD_{DNN}(l) = \frac{\sum_{f=f_{min}}^{f_{max}} \bar{s}(l, f)p_{DNN}(l, f)}{\sum_{f=f_{min}}^{f_{max}} \bar{s}(l, f)}$$

$$\eta_1 = \eta VAD_{DNN}(l)$$

-continued $$\eta_2 = \eta(1 - VAD_{DNN}(l))$$

where $\eta$ is a maximum step size that can be used for sub-band parameter tracking (and may be a tunable hyper-parameter associated with the DNN), and $f_{min}$ to $f_{max}$ represents a frequency range for which speech is dominant (such as 0-2 kHz).

In some implementations, a VAD based on multi-frame linear processing ($VAD_{lin}(l)$) can be expressed as:

$$r(l) = \frac{\sum_{f=f_{min}}^{f_{max}} \bar{s}(l,f)}{\sum_{f=f_{min}}^{f_{max}} \bar{n}(l,f)}$$

$$VAD_{lin}(l) = \begin{cases} 1 & \text{if } r(t) > c_1 \text{ or } c_1 \text{ or } VAD_{DNN}(t) > c_2 \quad \text{for at least one } t \in \{l, l-1, \ldots, l-D-1\} \\ 0 & \text{otherwise} \end{cases}$$

where D is a window (such as 64 ms) in which the VAD monitors for speech activity. If no speech is detected within the past D frames, then the current frame is considered a noise frame having $VAD_{lin}(l)=0$. In some implementations, $VAD_{lin}(l)$ may be used to indicate which sets of GMM parameters (such as for speech or noise) should be updated, as follows:

$$VAD_{lin}(l) = \begin{cases} 1 & \text{update } w_1(l,f), \mu_1(l,f), \sigma_1(l,f) \\ 0 & \text{update } w_2(l,f), \mu_2(l,f), \sigma_2(l,f) \end{cases}$$

In some implementations, the nonlinear post-filter 320 may estimate the magnitude of noise ($p_n(l, f)$) in the filtered speech signal $\bar{s}^i(l, f)$ based on the probability of speech $p_{GMM}(l, f)$ and, using spectral subtraction, may further determine a spectral suppression gain ($G_{GMM}(l, f)$) that can be applied to the filtered speech signal $\bar{s}^i(l, f)$ to produce the denoised speech signal $s^i(l, f)$:

$$P_n(l, f) = p_{GMM}(l, f)P_n(l-1, f) + (1 - p_{GMM}(l, f))|\bar{s}^i(l, f)|$$

$$G_{GMM}(l, f) = \max\left(\frac{\max(|\bar{s}^i(l, f)| - P_n(l, f), 0)}{|\bar{s}^i(l, f)|}, g\right)$$

$$s^i(l, f) = G_{GMM}(l, f)\bar{s}^i(l, f)$$

where g is a tuning parameter which represents the floor gain for spectral subtraction.

As a result of linear filtering and nonlinear post-filtering, the denoised speech signal $\bar{s}^i(l, f)$ output by the SSP system 300 may contain less noise than the speech signal $\tilde{s}^i(l, f)$ originally received by the SSP system 300. In some aspects, any remaining noise in the denoised speech signal $s^i(l, f)$ may be further reduced by passing the denoised speech signal $s^i(l, f)$ back into the DNN (such as described with reference to FIG. 2).

Aspects of the present disclosure recognize that noise patterns are likely to remain relatively unchanged between successive audio frames (or audio frames that otherwise occur in close temporal proximity). With reference to the example to FIG. 2, the background noise in a first audio frame 202 (such as l=1) may be substantially the same, if not identical, to the background noise in a second audio frame 202 that immediately follows the first audio frame 202 (such as l=2). Thus, the DNN 220 may compute substantially the same spectral suppression gain $G_{DNN}{}^i(1, f)$ in response to the first audio frame 202 as the second audio frame 202 ($G_{DNN}{}^i(1,f) \approx G_{DNN}{}^i(2,f)$). Thus, in some aspects, the speech enhancement system 200 may reduce the number of computations performed by the DNN 220 by reusing the spectral suppression gain $G_{DNN}{}^i(1, f)$, computed during a given iteration i of the speech enhancement operation, to process multiple audio frames.

Figure 4A:
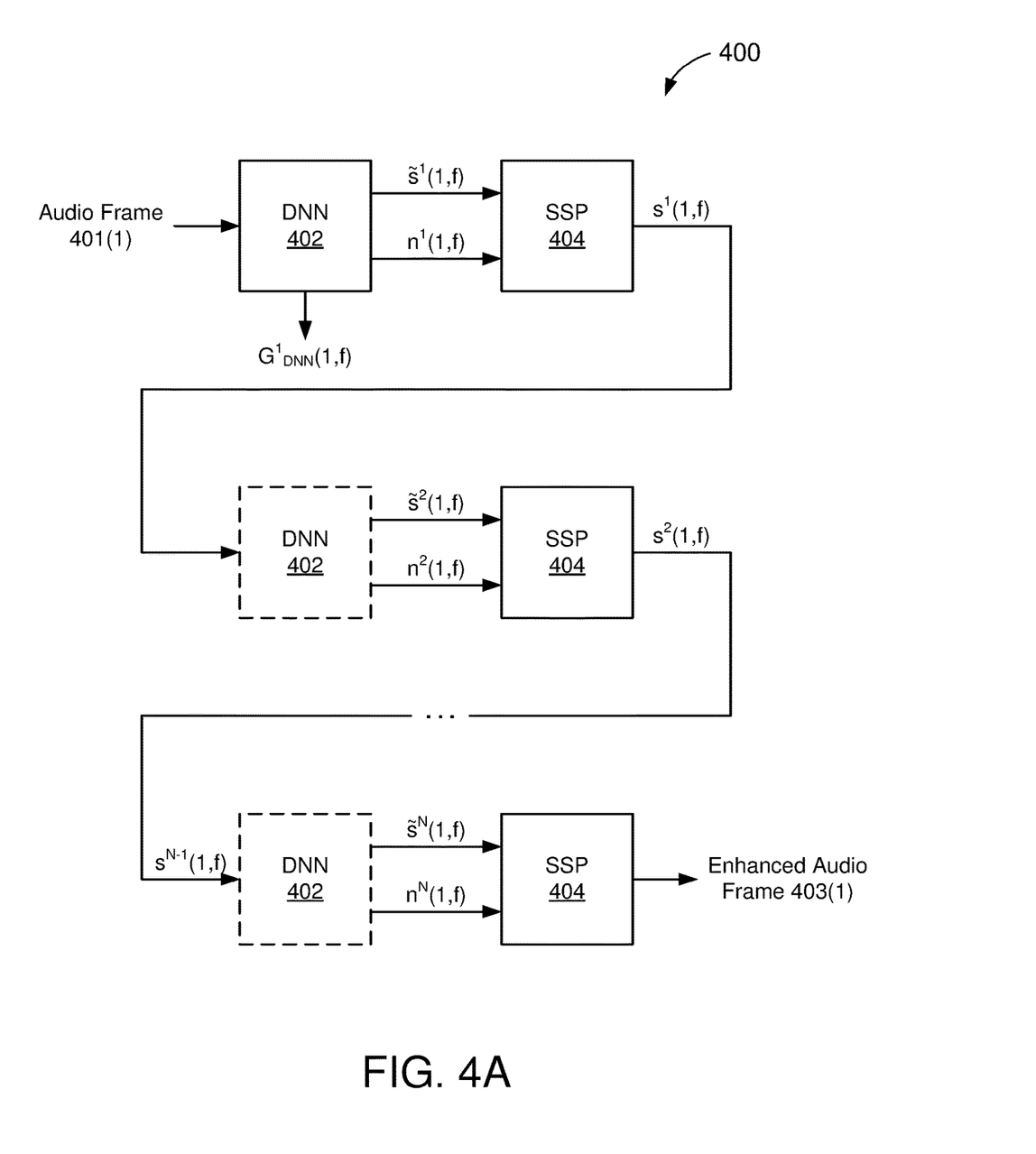
FIGS. 4A-4C show example operations of a speech enhancement system for processing a series of audio frames to produce a series of enhanced audio frames.
Figure 4B:
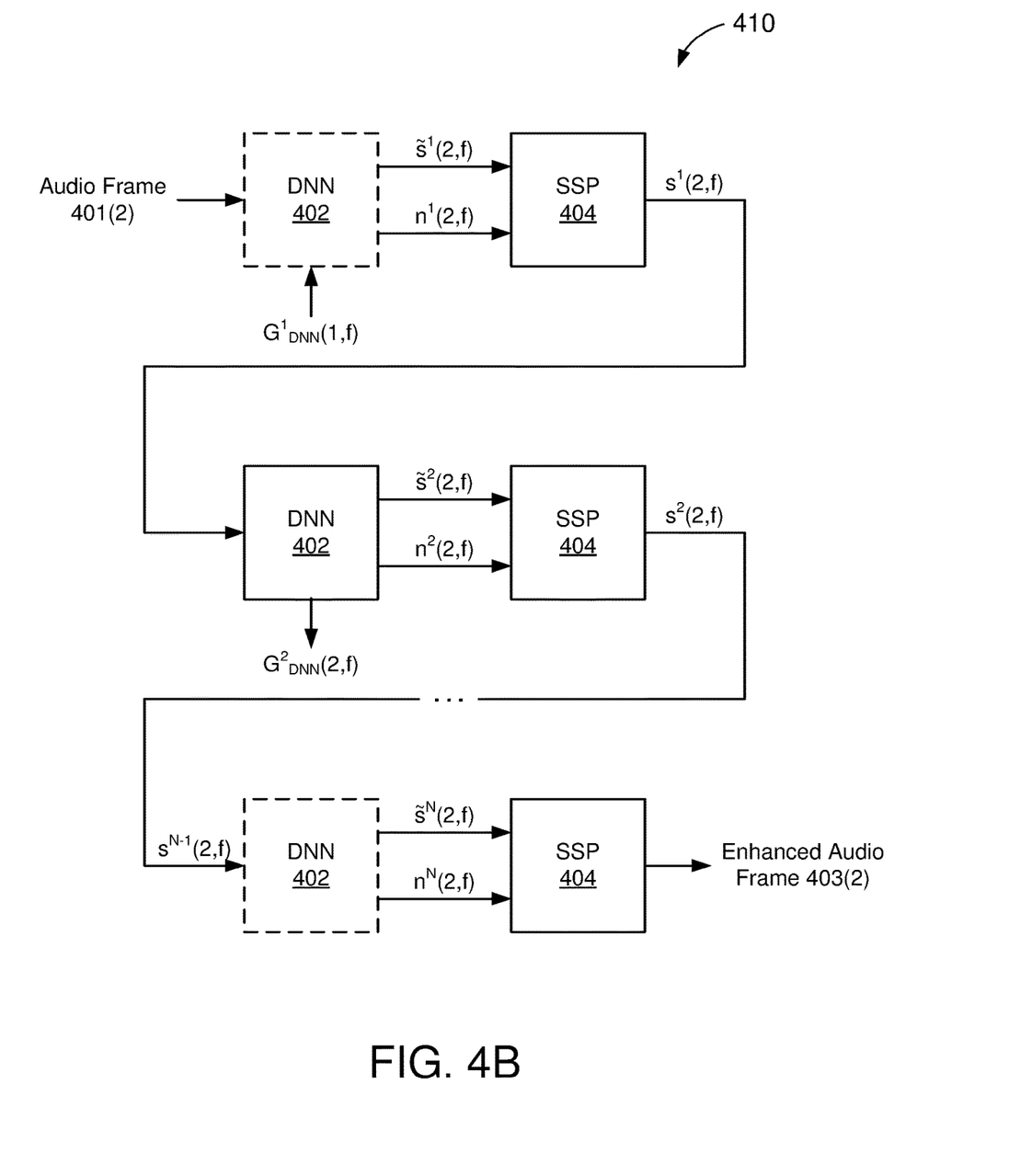
Figure 4C:
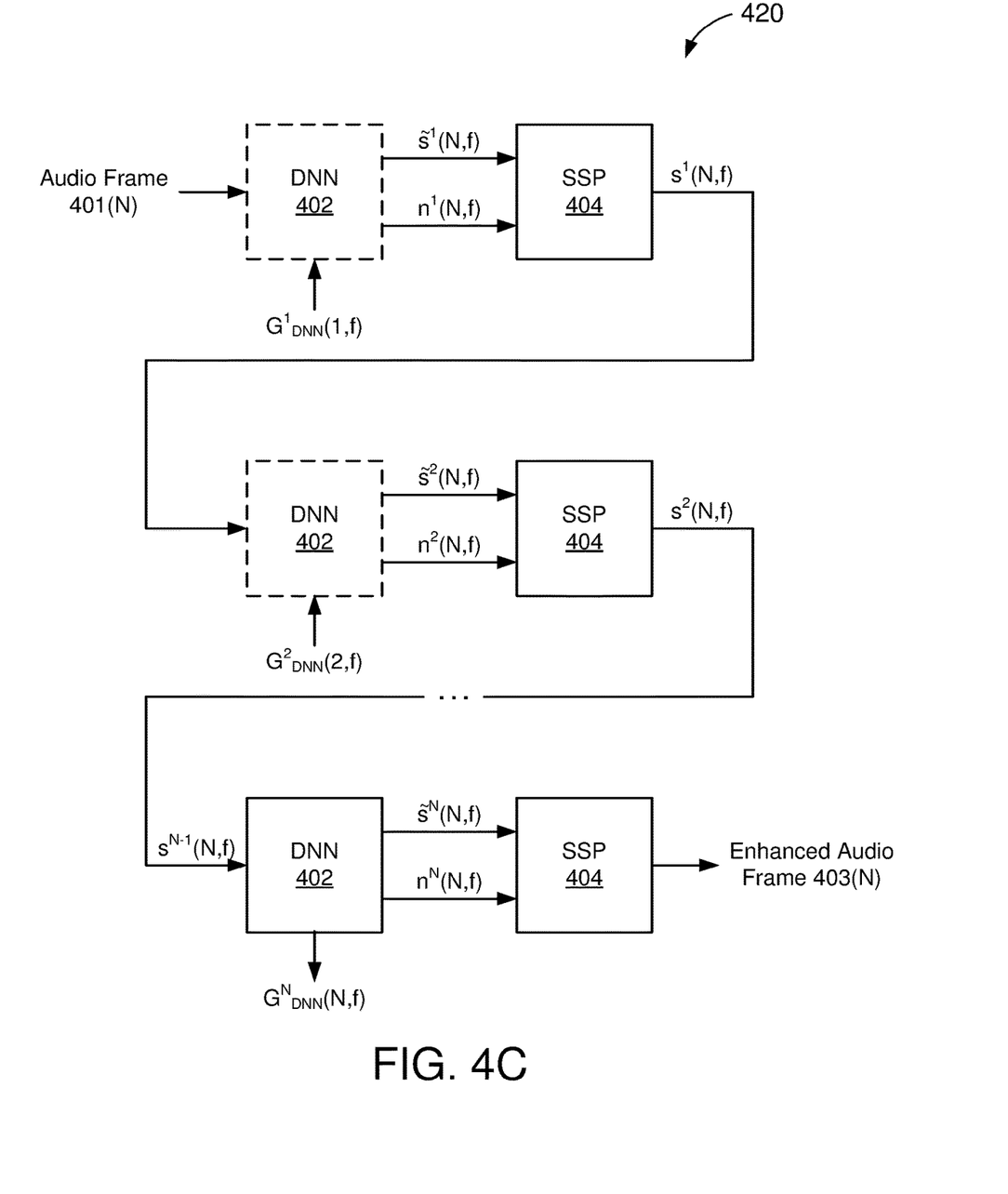

FIGS. 4A-4C show example operations 400-420, respectively, of a speech enhancement system for processing a series of audio frames to produce a series of enhanced audio frames. The speech enhancement system includes a DNN 402 and an SSP 404. In some implementations, the speech enhancement system may be one example of the speech enhancement system 200 of FIG. 2. As such, the DNN 402 and SSP 404 may be examples of the DNN 220 and SSP 230, respectively, of FIG. 2.

With reference to FIG. 4A, the speech enhancement system receives a first audio frame 401(1) and produces an enhanced audio frame 403(1) by recursively suppressing a noise component of the first audio frame 401(1) over a number (N) of iterations. More specifically, in the example of FIG. 4A, the DNN 402 computes a spectral suppression gain only during the first iteration (i=1) of the speech enhancement operation 400. In other words, the DNN 402 may refrain from performing one or more neural network processing operations (such as convolution operations or pooling operations, among other examples) during any of the remaining iterations of the speech enhancement operation (such as for i=2–N).

For each iteration (i) of the speech enhancement operation 400, the DNN 402 has an initialized gain $G_{DNN}{}^i(0, f)=1$, i=1, . . . N. During the first iteration (i=1) of the speech enhancement operation 400, the audio frame 401(1) is processed through each layer of the DNN 402. In other words, the DNN 402 may compute a spectral suppression gain $G_{DNN}{}^1(1, f)$ based on the received audio frame 401(1) (such as described with reference to FIG. 2). In some implementations, the DNN 402 may store the computed spectral suppression gain $G_{DNN}{}^1(1, f)$ for future use. The DNN 402 further infers a speech signal $\tilde{s}^1(1, f)$ and a noise signal $n^1(1, f)$ by applying the spectral suppression gain $G_{DNN}{}^1(1, f)$ to the received audio frame 401(1). The SSP 404 receives the signals $\tilde{s}^1(1, f)$ and $n^1(1, f)$ output by the DNN 402 and produces a denoised speech signal $s^1(1, f)$ based, at least in part, on the received speech signal $\tilde{s}^1(1, f)$ (such as described with reference to FIG. 3).

During the second iteration (i=2) of the speech enhancement operation 400, the denoised speech signal $s^1(1, f)$ is fed back into the DNN 402 to produce another speech signal $\tilde{s}^2(1, f)$ and another noise signal $n^2(1, f)$. However, the DNN 402 does not compute a new spectral suppression gain based on the denoised speech signal $s^1(1, f)$. Instead, the DNN 402 may reuse an existing spectral suppression gain computed in response to a previous audio frame. When the audio frame 401(1) is the first audio frame in a sequence of audio frames (such that no spectral suppression gain has been previously computed by the DNN 402), the DNN 402 may use the initial gain $G_{DNN}^2(0, f)=1$ to produce the speech signal $\tilde{s}^2(1, f)$ and noise signal $n^2(1, f)$.

During the $N^{th}$ iteration (i=N) of the speech enhancement operation 400, a denoised speech signal $s^{N-1}(1, f)$ is fed back into the DNN 402 to produce another speech signal $\tilde{s}^N(1, f)$ and another noise signal $n^N(1, f)$. However, the DNN 402 does not compute a new spectral suppression gain based on the denoised speech signal $s^{N-1}(1, f)$. Instead, the DNN 402 may reuse an existing spectral suppression gain computed in response to a previous audio frame. As described above, when the audio frame 401(1) is the first audio frame in a sequence of audio frames (such that no spectral suppression gain has been previous computed by the DNN 402), the DNN 402 may use the initial gain $G_{DNN}^N(0, f)=1$ to produce the speech signal $\tilde{s}^N(1, f)$ and noise signal $n^N(1, f)$.

With reference to FIG. 4B, the speech enhancement system receives a second audio frame 401(2) and produces an enhanced audio frame 403(2) by recursively suppressing a noise component of the second audio frame 401(2) over N iterations. More specifically, in the example of FIG. 4B, the DNN 402 computes a new spectral suppression gain only during the second iteration (i=2) of the speech enhancement operation 410. In other words, the DNN 402 may refrain from performing one or more neural network processing operations (such as convolution operations or pooling operations, among other examples) during any of the remaining iterations of the speech enhancement operation (such as for i=1 or 3-N).

During the first iteration (i=1) of the speech enhancement operation 410, the DNN 402 receives the audio frame 401(2) and infers a speech signal $\tilde{s}^1(2, f)$ and a noise signal $n^1(2, f)$ by applying a spectral suppression gain to the received audio frame 401(2) (such as described with reference to FIG. 2). However, the DNN 402 does not compute a new spectral suppression gain based on the audio frame 401(2). Instead, the DNN 402 may reuse the spectral suppression gain $G_{DNN}^1(1, f)$ computed in response to the audio frame 401(1) (such as described with reference to FIG. 4A). The SSP 404 receives the signals $\tilde{s}^1(2, f)$ and $n^1(2, f)$ output by the DNN 402 and produces a denoised speech signal $s^1(2, f)$ based, at least in part, on the received speech signal $\tilde{s}^1(2, f)$ (such as described with reference to FIG. 3).

During the second iteration (i=2) of the speech enhancement operation 410, the denoised speech signal $s^1(2, f)$ is fed back into the DNN 402 to produce another speech signal $\tilde{s}^2(2, f)$ and another noise signal $n^2(2, f)$. In the example of FIG. 4B, the denoised speech signal $s^1(2, f)$ is processed through each layer of the DNN 402. In other words, the DNN 402 may compute a new spectral suppression gain $G_{DNN}^2(2, f)$ based on the denoised speech signal $s^1(2, f)$. In some implementations, the DNN 402 may store the computed spectral suppression gain $G_{DNN}^2(2, f)$ for future use. The DNN 402 infers the speech signal $\tilde{s}^2(2, f)$ and the noise signal $n^2(2, f)$ by applying the new spectral suppression gain $G_{DNN}^2(2, f)$ to the denoised speech signal $s^1(2, f)$. The SSP 404 receives the signals $\tilde{s}^2(2, f)$ and $n^2(2, f)$ output by the DNN 402 and produces another denoised speech signal $s^2(2, f)$ based, at least in part, on the received speech signal $\tilde{s}^2(2, f)$.

During the $N^{th}$ iteration (i=N) of the speech enhancement operation 410, a denoised speech signal $s^{N-1}(2, f)$ is fed back into the DNN 402 to produce another speech signal $\tilde{s}^N(2, f)$ and another noise signal $n^N(2, f)$. However, the DNN 402 does not compute a new spectral suppression gain based on the denoised speech signal $s^{N-1}(2, f)$. Instead, the DNN 402 may reuse an existing spectral suppression gain computed in response to a previous audio frame (such as described with reference to FIG. 4A). If no existing spectral suppression gain is stored for the $N^{th}$ iteration, the denoised speech signal $s^N(2, f)$ may be unchanged by the DNN 402 (so that $\tilde{s}^N(2, f)=s^{N-1}(2, f)$). The SSP 404 receives the signals $\tilde{s}^N(2, f)$ and $n^N(2, f)$ output by the DNN 402 and produces the enhanced audio frame 403(2) based, at least in part, on the received speech signal $\tilde{s}^N(2, f)$.

With reference to FIG. 4C, the speech enhancement system receives an $N^{th}$ audio frame 401(N) and produces an enhanced audio frame 403(N) by recursively suppressing a noise component of the $N^{th}$ audio frame 401(N) over N iterations. More specifically, in the example of FIG. 4C, the DNN 402 computes a new spectral suppression gain only during the $N^{th}$ iteration (i=N) of the speech enhancement operation 420. In other words, the DNN 402 may refrain from performing one or more neural network processing operations (such as convolution operations or pooling operations, among other examples) during any of the remaining iterations of the speech enhancement operation (such as for i=1 to N-1).

During the first iteration (i=1) of the speech enhancement operation 420, the DNN 402 receives the audio frame 401(N) and infers a speech signal $\tilde{s}^1(N, f)$ and a noise signal $n^1(N, f)$ by applying a spectral suppression gain to the received audio frame 401(N) (such as described with reference to FIG. 2). However, the DNN 402 does not compute a new spectral suppression gain based on the audio frame 401(N). Instead, the DNN 402 may reuse the spectral suppression gain $G_{DNN}^1(1, f)$ computed in response to the audio frame 401(1) (such as described with reference to FIG. 4A). The SSP 404 receives the signals $\tilde{s}1(N, f)$ and $n^1(N, f)$ output by the DNN 402 and produces a denoised speech signal $s^1(N, f)$ based, at least in part, on the received speech signal $\tilde{s}^1(N, f)$ (such as described with reference to FIG. 3).

During the second iteration (i=2) of the speech enhancement operation 420, the denoised speech signal $s^1(N, f)$ is fed back into the DNN 402 to produce another speech signal $\tilde{s}^2(N, f)$ and another noise signal $n^2(N, f)$. However, the DNN 402 does not compute a new spectral suppression gain based on the denoised speech signal $s^1(N, f)$. Instead, the DNN 402 may reuse the spectral suppression gain $G_{DNN}^2(2, f)$ computed in response to the audio frame 401(2) (such as described with reference to FIG. 4B). The SSP 404 receives the signals $\tilde{s}^2(N, f)$ and $n^2(N, f)$ output by the DNN 402 and produces a denoised speech signal $s^2(N, f)$ based, at least in part, on the received speech signal $\tilde{s}^2(N, f)$.

During the $N^{th}$ iteration (i=N) of the speech enhancement operation 410, a denoised speech signal $s^{N-1}(N, f)$ is fed back into the DNN 402 to produce another speech signal $\tilde{s}^N(N, f)$ and another noise signal $n^N(N, f)$. In the example of FIG. 4C, the denoised speech signal $s^{N-1}(N, f)$ is processed through each layer of the DNN 402. In other words, the DNN 402 may compute a new spectral suppression gain $G_{DNN}^N(N, f)$ based on the denoised speech signal $s^{N-1}(N, f)$. In some implementations, the DNN 402 may store the computed spectral suppression gain $G_{DNN}^N(N, f)$ for future use. The DNN 402 infers the speech signal $\tilde{s}^N(N, f)$ and the noise signal $n^N(N, f)$ by applying the new spectral suppression gain $G_{DNN}^N(N, f)$ to the denoised speech signal $s^{N-1}(N, f)$. The SSP 404 receives the signals $\tilde{s}^N(N, f)$ and $n^N(N,f)$ output by the DNN 402 and produces the enhanced audio frame 403(N) based, at least in part, on the received speech signal $\tilde{s}^N(N, f)$.

As shown in FIGS. 4A-4C, the DNN 402 computes only one new spectral suppression gain $G_{DNN}^i(1, f)$ in response to each of the received audio frames 401(1)-401(N). More specifically, each new spectral suppression gain $G_{DNN}{}^i(l, f)$ is computed during a different iteration of the speech enhancement operations 400-420. By interleaving the neural network operations performed by the DNN 402 across N iterations and N audio frames, aspects of the present disclosure may significantly reduce the power consumption of the speech enhancement system while maintaining fairly accurate levels of noise suppression for each of the audio frames 401(1)-401(N).

Figure 5:
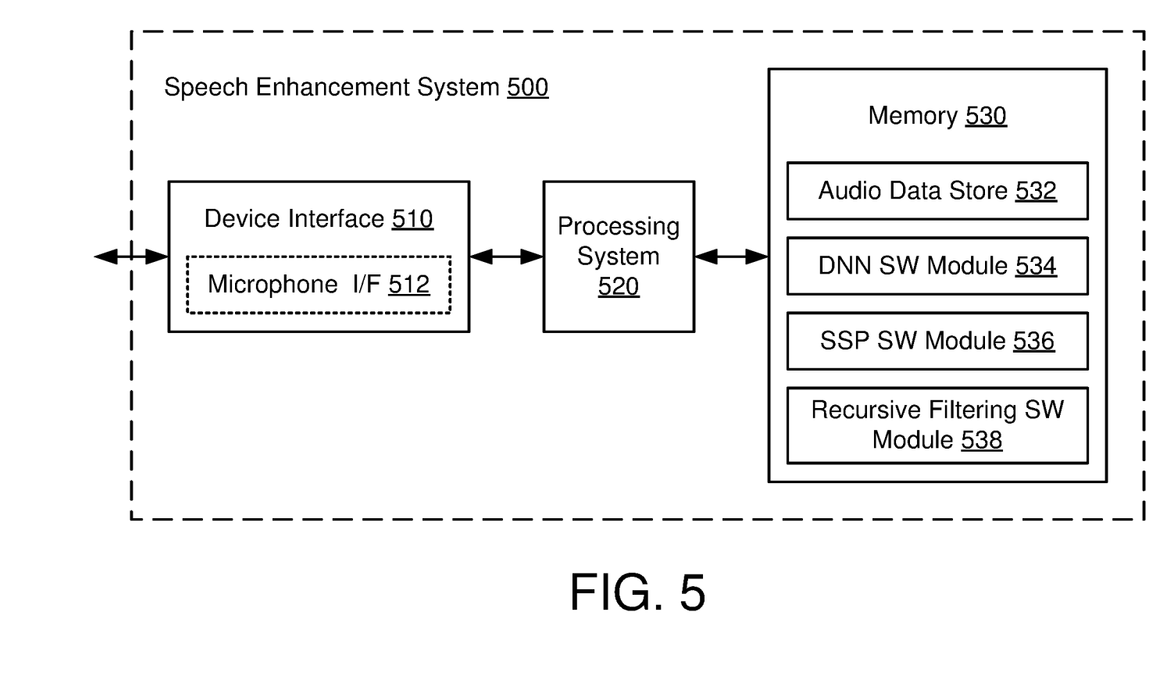
FIG. 5 shows another block diagram of an example speech enhancement system, according to some implementations.

FIG. 5 shows another block diagram of an example speech enhancement system 500, according to some implementations. More specifically, the speech enhancement system 500 may be configured to perform a multi-pass speech enhancement operation that recursively suppresses noise in a received audio signal. In some implementations, the speech enhancement system 500 may be one example of the speech enhancement component 120 of FIG. 1. The speech enhancement system 500 includes a device interface 510, a processing system 520, and a memory 530.

The device interface 510 is configured to communicate with one or more components of an audio receiver (such as the microphone 110 of FIG. 1). In some implementations, the device interface 510 may include a microphone interface (I/F) 512 configured to receive a single channel audio signal via a microphone. In some implementations, the microphone interface 512 may sample or receive individual frames of the audio signal at a frame hop associated with the speech enhancement system 500. For example, the frame hop may represent a frequency at which an application requires or otherwise expects to receive enhanced audio frames from the speech enhancement system 500.

The memory 530 may include an audio data store 532 configured to store a received frame of the audio signal as well as any intermediate signals that may be produced by the speech enhancement system 500 as a result of performing the multi-pass speech enhancement operation (such as any of the speech signals, noise signals, filtered speech signals, or denoised speech signals described with reference to FIGS. 2 and 3). The memory 530 also may include a non-transitory computer-readable medium (including one or more nonvolatile memory elements, such as EPROM, EEPROM, Flash memory, or a hard drive, among other examples) that may store at least the following software (SW) modules:

a DNN SW module 534 to infer a first speech signal representing a speech component of the received audio frame based on a neural network model;
an SSP SW module 536 to denoise the first speech signal based at least in part on one or more statistical signal processing operations; and
a recursive filtering SW module 538 to infer a second speech signal representing a speech component of the denoised first speech signal based on the neural network model.

Each software module includes instructions that, when executed by the processing system 520, causes the speech enhancement system 500 to perform the corresponding functions.

The processing system 520 may include any suitable one or more processors capable of executing scripts or instructions of one or more software programs stored in the speech enhancement system 500 (such as in the memory 530). For example, the processing system 520 may execute the DNN SW module 534 to infer a first speech signal representing a speech component of the received audio frame based on a neural network model. The processing system 520 also may execute the SSP SW module 536 to denoise the first speech signal based at least in part on one or more statistical signal processing operations. Further, the processing system 520 may execute the recursive filtering SW module 538 to infer a second speech signal representing a speech component of the denoised first speech signal based on the neural network model.

Figure 6:
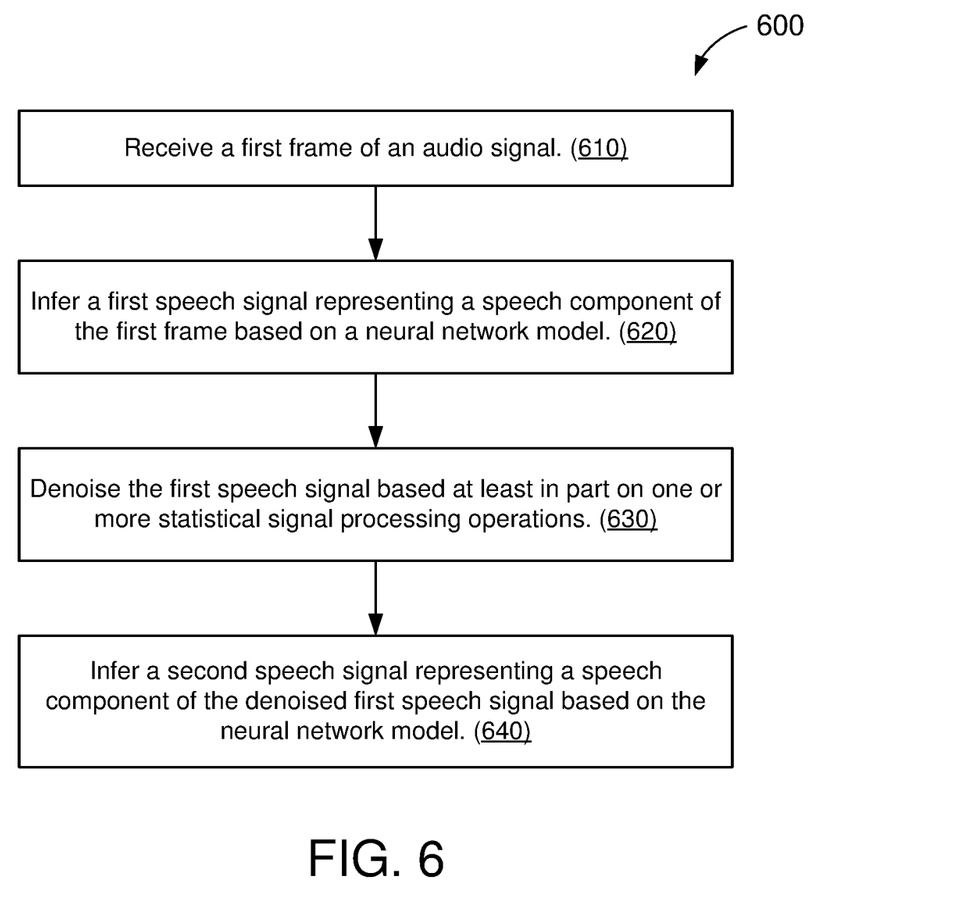
FIG. 6 shows an illustrative flowchart depicting an example operation for processing audio signals, according to some implementations.

FIG. 6 shows an illustrative flowchart depicting an example operation 600 for processing audio signals, according to some implementations. In some implementations, the example operation 600 may be performed by a speech enhancement system such as the speech enhancement component 120 of FIG. 1 or the speech enhancement system 200 of FIG. 2.

The speech enhancement system may receive a first frame of an audio signal (610). In some implementations, the first frame may include a single channel of audio data. The speech enhancement system may infer a first speech signal representing a speech component of the first frame based on a neural network model (620). The speech enhancement system may further denoise the first speech signal based at least in part on one or more statistical signal processing operations (630). In some implementations, the speech enhancement system may add a portion of the first frame to the first speech signal prior to denoising the first speech signal. Further, the speech enhancement system may infer a second speech signal representing a speech component of the denoised first speech signal based on the neural network model (640).

In some aspects, the one or more statistical signal processing operations may include a linear filtering operation. In some other aspects, the one or more statistical signal processing operations may include a nonlinear filtering operation. In some implementations, the denoising of the first speech signal may include applying, to the first speech signal, a multi-frame beamforming filter that produces a filtered speech signal; determining a probability of speech in the filtered speech signal based on a Gaussian mixture model (GMM); and generating the denoised first speech signal based at least in part on the probability of speech in the filtered speech signal.

In some implementations, the second speech signal may be inferred without performing one or more neural network operations associated with the neural network model. In some implementations, the speech enhancement system may further denoise the second speech signal based at least in part on the one or more statistical signal processing operations. Further, in some implementations, the speech enhancement system may infer a third speech signal representing a speech component of the denoised second speech signal based on the neural network model.

In some aspects, the speech enhancement system may further receive a second frame of the audio signal; infer a third speech signal representing a speech component of the second frame based on the neural network model; denoise the third speech signal based at least in part on the one or more statistical signal processing operations; and infer a fourth speech signal representing a speech component of the denoised third speech signal based on the neural network model. In some implementations, the third speech signal may be inferred without performing one or more neural network operations associated with the neural network model. In some implementations, the third speech signal may be inferred based on a spectral suppression gain determined by a neural network associated with the neural network model in response to the first speech signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of speech enhancement, comprising:
receiving a first frame of an audio signal;
inferring, using a neural network model, a first speech signal representing a speech component of the first frame;
denoising the first speech signal using one or more statistical signal processing operations; and
inferring, using the neural network model, a second speech signal representing a speech component of the denoised first speech signal.

2. The method of claim 1, wherein the first frame comprises a single channel of audio data.

3. The method of claim 1, further comprising:
adding a portion of the first frame to the first speech signal prior to denoising the first speech signal.

4. The method of claim 1, wherein the one or more statistical signal processing operations include a linear filtering operation.

5. The method of claim 1, wherein the one or more statistical signal processing operations include a nonlinear filtering operation.

6. The method of claim 1, wherein the denoising of the first speech signal comprises:
applying, to the first speech signal, a multi-frame beamforming filter that produces a filtered speech signal;
determining a probability of speech in the filtered speech signal based on a Gaussian mixture model (GMM); and
generating the denoised first speech signal based at least in part on the probability of speech in the filtered speech signal.

7. The method of claim 1, further comprising:
denoising the second speech signal based at least in part on the one or more statistical signal processing operations.

8. The method of claim 7, further comprising:
inferring a third speech signal representing a speech component of the denoised second speech signal based on the neural network model.

9. The method of claim 1, wherein the second speech signal is inferred without performing one or more neural network operations associated with the neural network model.

10. The method of claim 1, further comprising:
receiving a second frame of the audio signal;
inferring a third speech signal representing a speech component of the second frame based on the neural network model;
denoising the third speech signal based at least in part on the one or more statistical signal processing operations; and
inferring a fourth speech signal representing a speech component of the denoised third speech signal based on the neural network model.

11. The method of claim 10, wherein the third speech signal is inferred without performing one or more neural network operations associated with the neural network model.

12. The method of claim 10, wherein the third speech signal is inferred based on a spectral suppression gain determined by a neural network associated with the neural network model in response to the first speech signal.

13. A speech enhancement system comprising:
a processing system; and
a memory storing instructions that, when executed by the processing system, causes the speech enhancement system to:
receive a first frame of an audio signal;
infer, using a neural network model, a first speech signal representing a speech component of the first frame;
denoise the first speech signal using one or more statistical signal processing operations; and
infer, using the neural network model, a second speech signal representing a speech component of the denoised first speech signal.

14. The speech enhancement system of claim 13, wherein the first frame comprises a single channel of audio data.

15. The speech enhancement system of claim 13, wherein execution of the instructions further causes the speech enhancement system to:
add a portion of the first frame to the first speech signal prior to denoising the first speech signal.

16. The speech enhancement system of claim 13, wherein the denoising of the first speech signal comprises:
applying, to the first speech signal, a multi-frame beamforming filter that produces a filtered speech signal;
determining a probability of speech in the filtered speech signal based on a Gaussian mixture model (GMM); and generating the denoised first speech signal based at least in part on the probability of speech in the filtered speech signal.

17. The speech enhancement system of claim 13, wherein execution of the instructions further causes the speech enhancement system to:
denoise the second speech signal based at least in part on the one or more statistical signal processing operations.

18. The speech enhancement system of claim 13, wherein the second speech signal is inferred without performing one or more neural network operations associated with the neural network model.

19. The speech enhancement system of claim 13, wherein execution of the instructions further causes the speech enhancement system to:
receive a second frame of the audio signal;
infer a third speech signal representing a speech component of the second frame based on the neural network model;
denoise the third speech signal based at least in part on the one or more statistical signal processing operations; and
infer a fourth speech signal representing a speech component of the denoised third speech signal based on the neural network model.

20. The speech enhancement system of claim 19, wherein the third speech signal is inferred based on a spectral suppression gain determined by a neural network associated with the neural network model in response to the first speech signal.

* * * * *